Patented Jan. 10, 1950

2,493,867

UNITED STATES PATENT OFFICE 2,493,867

RECOVERY OF ABIETIC ACID IN THE FORM OF ITS QUARTER SALT

Frederick H. Gayer, Chicago, Ill., assignor to Continental Research Corp., Chicago Heights, Ill., a corporation of Illinois No Drawing. Application May 3, 1947, Serial No. 745,723

21 Claims. (Cl. 260—97.5)

This invention relates to a process for obtaining resin acids of the abietic acid type in the form of their quarter salt.

In one specific embodiment the present invention relates to a process for separating resin acids of the abietic acid type in the form of their quarter salt, from resin acid mixtures of sizable abietic acid content and originating from various species of coniferous trees, such as rosin, tall oil resin acids, and the like starting materials as hereinafter more fully described.

It is well known that rosin contains two main types of resin acids:

(1) Primary resin acids which include "sapinic acids," l-pimaric and d-pimaric acids.

(2) Abietic acids, the most important individual member of which is l-abietic acid.

The primary acids are the acids produced by the living tree. With the exception of d-pimaric acid they are highly unstable compounds and are isomerized into abietic acids by heating to relatively moderate temperatures, by catalytic agents such as mineral acids, glacial acetic acid or by ultra-violet light. The isomerization apparently proceeds by stages, each stage corresponding to individual acids intermediate between the unstable primary acids and the relatively stable final product of isomerization, viz. l-abietic acid. The isomerized acids are isomorphous and by fractional crystallization only a partial resolution of their mixtures can be effected. It is for this reason that in the technical literature the isomerized acids are usually referred to simply as "abietic acid" which is to be understood as a generic term rather than one implying a chemical individual. It is in this sense that the term will be used herein. A stricter characterization of what constitutes abietic acid according to the present disclosure is found in the ability of l-abietic acid and the more highly isomerized acids to form an acid alkali metal salt of the composition $$3C_{19}H_{29}COOH \cdot C_{19}H_{29}COONa$$

the so-called quarter salt, while the primary acids and possibly the less isomerized acids lack this ability. The quarter salt has a strong tendency to crystallize from organic solvent solutions and has therefore been used for the isolation of abietic acid from other rosin compounds. The term "abietic acid," as used herein, is therefore further defined as denoting those components of rosin which are capable of crystallizing in the form of the quarter salt.

According to the isomerizing influences to which rosin is subjected before and during its processing, the abietic acid content of different samples of rosin is subject to wide variations. Generally speaking, the gum rosin contains less abietic acid than wood rosin. Rosin treated either by heating or by chemical means to increase the proportion of abietic acid is known as "isomerized rosin," one form of which is "Commercial Abietic Acid." A highly isomerized rosin is available in the resin acid fraction of tall oil, the abietic acid content of which is well over 50%.

A common characteristic of the resin acid mixtures enumerated above is that if they are relatively free of oxidized rosin they will undergo crystallization if kept for prolonged periods at temperatures ranging from approximately 65 to 150° C. The tendency to crystallization sharply increases with the abietic acid content of the resin acid mixture and is incomparably stronger with tall oil resin acids than with gum or wood rosin.

An object of the present invention is the separation of abietic acid material, that is, abietic acid in the form of said quarter salt which may subsequently be decomposed to abietic acid, from the other types of resin acids which do not form a quarter salt and will be simply termed "non-abietic acids" or "non-abietic type resin acids."

In contrast to the starting materials and to the separated abietic acid material fraction, the non-abietic acid portion is characterized by the absence of crystallizability when kept for prolonged periods at higher temperatures. The non-abietic acid fraction therefore constitutes non-crystallizing rosin which is highly useful in the arts wherever crystallization during the heating of rosin is disadvantageous and the separation and recovery thereof is another object of my invention.

While rosin owes much of its traditional usefulness to the properties resulting from its complex composition, a successful method for separating its components as to chemical type may be of great value for future developments. Each type of resin acid can be assumed to be more useful for special purposes than its mixtures with other types. Besides having increased usefulness in some of the known commercial applications, such separated resin acids may find use as starting materials for synthetic products. Despite the obvious advantages involved, however, prior art relating to the separating, on a commercial scale, of resin acids of one type from those of another is practically non-existent. In known instances of the prior art of obtaining abietic acid, organic solvents are used as crystallizing media. According to some of these methods, the abietic acid is separated in the form of its quarter salt which, due to its low solubility in organic solvents, can be obtained in the crystalline form in a higher yield than abietic acid itself. However, the use of organic solvents makes all previously used methods unattractive.

According to the present invention and in distinction from the prior art, the quarter salt of abietic acid is obtained by using water as the crystallizing medium. A necessary condition for the formation of a crystalline product, as disclosed herein, is a minute subdivision and uniform distribution, briefly, a dispersion of resin acids in water which, besides acting as a dispersing medium for the resin acids, also contains a certain minimum proportion of resin acid soap in solution. I have found that in aqueous dispersions of resin acid mixtures in which at least one fourth of the resin acids are neutralized with an alkali metal base, on standing, especially at somewhat elevated temperatures, the quarter salt of abietic acid will crystallize, and that under favorable conditions it is possible to precipitate substantially all of the abietic acid present in the form of its crystalline quarter salt while the non-abietic type resin acids remain in the dispersion. By separating the crystals from the aqueous phase, as by filtration, quarter salt is obtained from which abietic acid of high purity can be recovered, the filtrate containing all of the non-abietic type resin acids originally present in the starting material.

The following examples are introduced to illustrate important features of the present invention.

Example 1

Ten grams N wood rosin, acid number 163, were heated under reflux with 8.9 cc. 2.135 N sodium hydroxide to neutralize 65% of the resin acids. The mixture was stirred into 400 cc. hot water, the resulting dispersion seeded with quarter salt crystals and frequently shaken while kept at about 80° C. for several hours.

*Crystalline product.*—1.6 grams quarter salt, acid number 126.

Example 2

N wood rosin was isomerized according to the procedure of Palkin and Harris [J. A. C. S. 56, 1935 (1934)]. The resulting isomerized rosin had an acid number of 165.

Ten grams of the isomerized rosin were heated with 9.7 cc. 2.135 N sodium hydroxide to neutralize 70% of the resin acids present. The mixture was stirred into 250 cc. boiling water and, while stirring was continued, 5.2 cc. 2 N sulphuric acid were added which caused decomposition of one-half of the soap previously formed. The milky dispersion which now contained 65% of the resin acids as dispersed free resin acids and 35% as soap was allowed to stand several hours at about 80° C. The crystals formed were separated by filtration.

*Crystalline product.*—6.0 grams quarter salt, acid number 130. Dissolving the quarter salt in benzol, refluxing the solution with a slight excess of hydrochloric acid, washing and evaporation of the benzol gave abietic acid, acid number 180.

The filtrate from the crystals was acidified and the liberated acids recovered. The recovered mixture was a soft solid at room temperature since it contained the major portion of the neutral matter originally present. In order to remove the neutral bodies the mixture was neutralized with 2.04 N sodium hydroxide and the neutral matter extracted with benzol. Decomposition of the extracted soap gave hard resin acids, acid number 173 and a melting point higher than that of the isomerized rosin. These resin acids are non-crystallizing when kept at elevated temperatures and do not form a quarter salt.

Example 3

Ten grams of a tall oil resin acid fraction, acid number 175, were reacted with 11.0 cc. 2.135 N sodium hydroxide to neutralize 75% of the resin acids present. The mixture was stirred into 250 cc. boiling water and stirring continued while 7.8 cc. 2 N sulphuric acid were added to decompose two-thirds of the soap formed. The dispersion was allowed to crystallize while it cooled to room temperature.

*Crystalline product.*—6.3 grams quarter salt, acid number 135.

These examples strikingly illustrate the simplicity and economy of the present process in obtaining the quarter salt as compared to the methods of the previous art which were based on the use of organic solvents. It is easily seen, however, that, as to results, crystallization from aqueous dispersion is fully equivalent to crystallization from organic solvent solutions; i. e. the quarter salt crystallizes from a medium which itself retains the non-abietic type resin acids and the neutral bodies. Indeed, crystallization from dispersion according to the present invention, might be looked upon as a partial, irreversible and oriented flocculation which affects only the abietic acid portion of the dispersed phase. In other words, the dispersions underlying the present process are highly unstable as regards the abietic acid portion but stable as to the non-abietic acid portion of the dispersed phase. This difference in stability makes a clean separation of the two types of resin acids possible.

The most important characteristic of the dispersions, useful in accordance with the present invention, is the proportion of free resin acids to total resin acids present in the dispersion. In Examples 1, 2 and 3 the proportions of free resin acids were 35%, 65% and 75%, respectively, the balance consisting of resin acid soap. It is easily seen that the function of the resin acid soap, at least that portion of the soap which is alkali abietate, is more than that of a dispersing agent, since the alkali abietate enters into the crystal structure of the quarter salt. As to the ratio of free resin acids to resin acid soap, the present disclosure is limited to a ratio of 3:1 or less. In distinction, my co-pending application, Serial No. 745,721, describes a method for obtaining crystalline abietic acid from dispersions in which the above ratio is higher than 3:1. The boundary between the crystallization of abietic acid and of quarter salt is not a sharp one and there may exist a narrow range of free resin acid:resin acid soap ratios in which both abietic acid and the quarter salt crystallize. It also will be realized that with different starting materials the dividing ratio may vary somewhat and allowance must also be made for such factors as the proportion of water to solids in the dispersions, the nature and the concentration of the salt present, the cation of the soap, details of manipulation, etc.

In the border region between quarter salt and abietic acid crystals, the type of crystal is especially sensitive to the effect of hydrolysis of the dissolved alkali abietate. Thus, factors favoring hydrolysis such as low soap concentration (high water ratio) favor the formation of abietic acid crystals, whereas influences which repress hydrolysis, such as presence of salt, shift crystallization toward the quarter salt side.

The proportion of free resin acids in a crystallizing dispersion is most conveniently expressed as the percentage proportion of free resin acids related to the total of free and neutralized resin acids present and will herein be termed "free resin acid ratio," abbreviated: FRA. Expressed in this form, dispersions in accordance with the present invention are of a free resin acid ratio of from about 10% to 75%, the yield of quarter salt increasing as the free resin acid ratio increases. As shown by Example 2, a free resin acid ratio of 65% gives a yield of quarter salt sufficiently high to result in a satisfactory separation of the abietic from the non-abietic type resin acids.

I will now describe in detail the starting materials used, and individual process steps, such as methods for obtaining the required FRA ratio and for creating dispersions, the effect of the concentration of the dispersed phase of salt concentration and of temperature, and other factors entering into the present process.

*Starting materials.*—Starting materials for the present process may be gum rosin, wood rosin, isomerized rosin or tall oil resin acids, or, in general, resin acid mixtures of sizable abietic acid content and originating from various species of coniferous trees. Preferably the starting materials should contain a minimum of oxidized material, the presence of which is liable to slow down crystallization of the abietic acid fraction. If the object is to obtain the quarter salt in the highest possible yield, starting materials of low abietic acid content may be given a previous isomerizing treatment.

Tall oil resin acid starting materials are available in a number of different forms. Tall oils as such, especially distilled or chemically refined or partially esterified tall oils are suitable starting materials. However, the yields of crystalline resin acids obtainable according to the present invention directly from tall oils are generally low because of the presence of a large proportion of fatty acids. The latter, even in the neutralized or otherwise modified state, have a tendency to prevent crystallization of the abietic acid fraction. For this reason, I prefer as starting materials tall oil resin acid concentrates. These may originate from any of the known processes for separating tall oil into its main components, namely fatty and resin acids, even though such separation might be rather incomplete. While some of the separation processes produce resin acids which for all practical purposes are free of fatty acids, the resin acid fraction from other processes might still contain minor portions of the fatty acid fractions, either modified or free fatty acids, originally present in tall oil. I have found that such tall oil resin acids can be efficiently processed according to the present invention. Since the fatty acids are stronger acids than the resin acids, decomposition of the resin acid soaps precedes that of the fatty acid soaps. Consequently, the fatty acids remain dissolved as soaps in the aqueous medium containing the non-crystallizing, non-abietic acid portion of the resin acids and are therefore completely separated from the crystalline quarter salt portion.

A few examples of tall oil resin acids especially useful as starting materials for the present process by way of illustration and not limitation are:

(1) The resin acid fraction obtained in the distillation of tall oil or modified (for example, partially esterified) tall oil by removing the major part of the fatty acids first, the resin acid fraction either coming over as a higher boiling distillate or remaining as still residue; (2) resin acid fractions originating from one of the numerous selective solvent processes for separating tall oil; (3) the dilute resin acid soap solution obtained according to Patent No. 2,356,988 and originating from a partial separation of fatty acid esters form a modified tall oil in which the fatty acids are present as alkyl esters; (4) the impure crystalline resin acids which separate from crude or distilled or chemically refined or partially modified tall oils on standing and still contain a minor portion of the non-abietic type resin acids and of the fatty acids originally present; (5) resin acid fractions furnished by a group of tall oil separation processes based on modifying the fatty acids, neutralizing the resin acids and removing the fatty acid component from the neutralized resin acids, etc. A typical example of these processes is that of Patent No. 2,348,970 to Gayer and Fawkes which is based on esterifying the fatty acids, neutralizing the resin acids to obtain water-soluble soaps and removing the fatty acid component by solvent extraction. These processes result in a resin acid soap solution which keep dissolved a portion of the extracting solvent. After removing the major portion of the solvent such resin acid soap solutions can be directly processed according to the present invention.

All the aforementioned starting materials contain diverse proportions of non-abietic type resin acids. However, the presence of non-abietic acids is not a necessary condition for obtaining the quarter salt according to the general principle of the present invention. Abietic acid, devoid of non-abietic type acids and obtained either by conventional methods or in accordance with the process disclosed in my co-pending application, Serial No. 745,721, can be transformed into the quarter salt by the process disclosed herein. That is, the quarter salt will crystallize from dispersions which contain abietic acid of a free resin acid ratio of from about 10% to 75%. Vice versa abietic acid can be prepared by the process of the aforementioned co-pending application by using the quarter salt as a starting material and increasing the FRA ratio to more than 75%. Considering the great simplicity and economy of the present process, as compared with methods involving the use of orlganic solvents, the purely preparative step of obtaining the quarter salt from crystalline abietic acid must be considered another object of the present invention.

Mixtures of two or more of any of the aforementioned starting materials can be used.

*FRA ratio and the preparation of dispersions.*—The FRA ratio in dispersions underlying the present invention may range from approximately 10% to 75%. It is obvious that for efficient operation such FRA ratios will be preferred as will result in maximum yields of the quarter salt and thereby insure maximum separation of the abietic acid from the non-abietic type resin acids. These optimum ratios, together with the operating details described, may be determined for each starting material separately but, in general, they will be in the FRA range of from about 40% to 75%. Establishing the FRA ratio at which crystallization is desired to take place may coincide, precede or follow the preparation of a dispersion. Thus, a resin acid soap contained in aqueous solution may be decomposed to yield any desired FRA ratio by reacting it with a suitable acid, such as sulphuric acid. If such decomposition is accompanied by moderate agitation the liberated free resin acids will form a dispersion suitable for the present process. Starting materials available in the form of free resin acids, such as rosin, may suitably be only partially neutralized with a strong alkali solution and then dispersed in requisite quantities of water, either by simple agitation or by the use of dispersing machinery. The desired FRA ratio also can be obtained in several steps. For example, a dispersion may be made with a certain FRA ratio and this subsequently changed to either a higher or to a lower figure by additional decomposition of soap or by adding alkali, respectively.

Thus, while the maximum yield of quarter salt is obtained in the free resin acid range of from about 40% to 75%, I may prepare as a first step a dispersion in which the free resin acids ratio is lower than that ultimately desired, and in the subsequent step increase the free resin acids ratio to the range giving maximum yield. The sequence of steps is helpful in obtaining a good dispersion when using only moderate agitation.

Besides applying agitation or using dispersing machines (colloid mills, homogenizers) other aids for obtaining dispersions can be used. For example, partially neutralized resin acids may be dissolved in a small quantity of a water miscible solvent, such as alcohol, and the solution stirred into suitable quantities of water. All these methods can be varied according to one or the other of the several modifications known to dispersion technology. For example, I may disperse a mixture of free resin acids and resin acid soaps in water, or disperse resin acids in a soap solution, or disperse resin acids in a suitable quantity of water containing sufficient alkali to produce the required quantity of soap.

A combination of dispersing methods also may be employed. For example, I may create a dispersion of a partially neutralized rosin by simple agitation and then run the dispersion through a dispersing or homogenizing machine to obtain a finer dispersion. Or I may partially neutralize the resin acids with a portion of alkali corresponding to the final FRA ratio and solubilize all or part of the balance of the resin acids with ammonia in order to obtain a soap or an easily dispersible free resin acid-resin acid soap mixture, then drive off the ammonia and thereby disperse the resin acids liberated by the removal of ammonia. A dispersion also may be diluted with water to decrease its solids content, or two dispersions of a different FRA ratio may be combined in such proportions that the resulting dispersions will be of the desired FRA ratio. From the foregoing, it must be evident that a large number of variations are possible in producing a certain FRA ratio or creating suitable dispersions and, therefore, the present invention is not limited to or dependent upon any particular method or sequence of steps in establishing a FRA ratio or creating a dispersion. In general, I prefer creating a crystallizing dispersion simultaneously with adjusting the FRA ratio by decomposing a neutral, or nearly neutral, or at least, completely water-soluble resin acid soap with acid because with this method satisfactory dispersions can be made with a minimum of mechanical work and simple equipment.

It also will be recognized by those skilled in the art that while the results obtainable according to the present invention so far have been considered to be a function of the FRA ratio, they also may be expressed in terms of hydrogen ion concentration of the aqueous dispersing medium. Thus, I found that the pH accompanying FRA ratios from 10% to 75% ranges from approximately 9.5 to about 8.5 to 8.0 and, at a constant FRA ratio, depends on the type of resin acids present, on the concentration of the dispersed phase and soap, the alkali metal base and decomposing acid used, salt concentration, temperature, etc. Under otherwise standard conditions, especially in large scale operation, the pH as a control factor can conveniently replace or supplement the use of the FRA ratio as a measure of the proportion of free resin acids to resin acid soaps.

The proportion of water to the resin acid starting material is of considerable importance in preparing the dispersions. This proportion, to be termed "water ratio," is defined as parts by weight of water to one part of starting material, the latter including not only free and neutralized resin acids but also neutral bodies and impurities.

The dispersions underlying the present process are of the oil-in-water type. As is known, to obtain such dispersions of resin acids, the water has to be present in considerable excess over the total resinous matter. If, for example, in one part of rosin 65% of the resin acids are neutralized by gently heating it under reflux with the calculated amount of 2 N sodium hydroxide, a water-in-oil type dispersion results. On slow addition of about five parts of hot water the quarter salt may begin to crystallize before reversion of the phases takes place. Such crystallization is not within the scope of the present invention. If, instead, the same quantity of hot water is added rapidly, reversal of phases takes place and an oil-in-water type dispersion is formed before crystallization sets in. In general, the formation of oil-in-water type dispersions of resin acids requires a minimum water ratio of from about 5 to 10, depending on the FRA ratio. To obtain easily filtrable dispersions, the water ratio should be at least from about 10 to 20. My preferred limits are a water ratio of from about 20 to about 50. Variations within these limits are substantially without effect on the results.

Another factor influencing the preparation of dispersions is the presence of salt dissolved in the aqueous phase. Such salt may originate from the decomposition reaction between resin acid soap and mineral acid in adjusting the free resin acid ratio and preparing the dispersion, or may be introduced by the water used, or may be contained in the starting material, as, for example, a salted out resin acid soap fraction. There is a certain maximum salt concentration below which dispersions are easily made and crystallization proceeds smoothly, resulting in well developed crystals. When the salt concentration exceeds the maximum limit, dispersion becomes difficult and a portion of the material to be dispersed may be precipitated in the resinous form, or a portion of the soap may be salted out. Maximum salt concentrations for sodium sulphate, for example, are of the order of 1.5 to 2.0% with respect to the water present. By using a sufficiently high water ratio in preparing or diluting the dispersions, the salt concentration can be conveniently reduced below the maximum concentration. If the salt is sodium sulphate or sodium chloride, I prefer to work at concentrations of about 1% or less. For example, in the foregoing Example 2 the decomposition of the sodium resinate with 5.2 cc. 2 N sulphuric acid caused the formation of 0.74 grams sodium sulphate which, dissolved in 250 cc. water gives a salt concentration of approximately 0.3%.

*Temperature.*—Of considerable importance for a successful operation of the present process is the temperature at which the dispersions are prepared and at which crystallization is allowed to proceed. I have found that both process steps can be carried out at a temperature range of from approximately normal room temperature to the boiling point of water. However, within the preferred ranges of FRA ratios, I prefer to work within a temperature range of from approximately 35° C. to 100° C. because in this range dispersions are easier made and crystallization takes place more rapidly than near room temperature. Thus, I found that dispersions made at higher temperatures from gum or wood rosin, or, in general, from rosins which have not been given an isomerizing treatment, if rapidly cooled to near room temperature, will not form any crystals at all or, at best, crystallize extremely slowly. Even at higher temperatures such dispersions frequently require stimulation by seeding or agitation to bring about crystallization.

Variations as to temperature are possible inasmuch as preparing the dispersions and crystallizing them can be done at different temperatures.

*Processing chemicals.*—The alkaline agents most likely to be used in commercial operation for neutralizing resin acids are sodium carbonate or sodium hydroxide. Other alkaline sodium compounds can be used for neutralization. Potassium is fully equivalent with sodium as it also forms the quarter salt. Mixtures of several alkaline neutralizing substances can be used. For partial decomposition of resin acid soaps a number of acids, organic or inorganic, or acid salts like sodium bisulphate can be used. For plant scale work I prefer sulphuric acid suitably diluted. It is immaterial whether the acid is added to a suitably diluted soap solution or whether a soap solution is poured into water containing the requisite amounts of acid. Carbon dioxide, if cheaply available, can be used to obtain dispersions giving quarter salt crystals.

*Time required for crystallization.*—I have found that the time required for complete crystallization varies widely with different starting materials, crystallization being the more rapid the higher the degree of isomerization of the starting material. Dispersions made from highly isomerized resin acid mixtures develop crystals spontaneously, starting within a few minutes after the dispersion is made and complete crystallization of the quarter salt is especially rapid.

The rate of crystallization is of an entirely different order in dispersions made from rosins of a low degree of isomerization such as gum rosin. Such dispersions crystallize very slowly. Crystallization can be stimulated by seeding, agitation, alternate cooling and heating. A homogenizing treatment also may initiate and accelerate crystallization. Normally, crystallization is complete in from about one to several hours. At FRA ratios resulting in maximum yields, the needle-shaped crystals of the quarter salt arrange themselves in the form of a stiff meshwork. The crystals are filtered and washed with water until the soap reaction of the wash water becomes negative.

*Crystal size and crystal forms.*—A necessary condition for efficient filtration is that the crystals be well developed and of a sufficiently large size. The rate of crystallization and correspondingly the size of crystals are conveniently controlled by the water ratio, higher ratios, i. e. lower concentration of the dispersed phase favoring slow crystallization and the formation of large crystals. While easily filtrable crystals may be so small as to appear crystalline only under magnification, under favorable conditions the quarter salt crystals reach linear dimensions of 1–2 mm.

The crystal form assumed by the quarter salt obtained according to the present process is the same as that obtained in organic solvent solutions, i. e. thin needles.

*Products.*—The crystalline products obtained according to the present invention are characterized by a purity much greater than that of the starting materials. While the acid number of the quarter salt obtained according to the examples is subject to rather wide variations, the average acid number of the abietic acid obtained by decomposing the quarter salt is about 180. Since the acid number of most starting materials ranges from about 160 to 170, the high acid number of the separated abietic aid portion indicates that a large part of neutral bodies of the starting material remains dispersed with the non-abietic type acids. The color of the abietic acid fraction also shows a great improvement over that of dark-colored starting materials. It is apparent that if applied to highly isomerized starting materials as, for example, tall oil resin acids, the present process is a highly efficient refining process since the bulk of the starting material is recovered in a high state of purity, the minor portion, consisting of non-abietic acids, neutral bodies and coloring matter, remaining in dispersion.

In commercial practice the quarter salt, if not used as such, may be decomposed to abietic acid by dissolving the quarter salt in a hydrocarbon solvent and treating the solution with a dilute mineral acid. In the alternative, the major portion of the quarter salt can be transformed into abietic acid in accordance with the procedure of my aforementioned co-pending application, as previously indicated herein. That is, using the quarter salt as starting material a dispersion is made, the FRA ratio increased to between 75% and 100 by decomposing it with mineral acid, and abietic acid is allowed to crystallize by permitting the dispersion to stand at a temperature of from room temperature to 100° C.

The non-abietic acid portion remaining in the filtrates from the crystalline quarter salt portion can be utilized in several ways. The filtrate from the quarter salt contains a minor portion of free resin acids and in appearance ranges from a clear soap solution to an opaque dispersion. One application of such dispersions may be their direct use as paper size. After neutralizing the free resin acids the filtrates also may be used for preparing metallic resinates. The solids content of the filtrates can also be recovered by decomposing the soap present and, if necessary, accelerating the coagulation of the free acid by heating or adding salt. Or the solids content of the filtrates may be salted out and the resulting resin acid-resin acid soap mixture further processed. The separation of the free resin acids from the acidified aqueous phase is greatly aided by the use of hydrocarbon solvents. The resulting solutions can be subjected to well-known refining processes to improve the color and decrease the neutral body content of the dissolved resin acids. Or such resin acid solutions can undergo chemical processing such as chlorination, sulphonation, acid dispersions are given in the following table. It was observed that up to a FRA ratio of 75% the crystals were needle shaped, whereas at 80% the characteristic plates of abietic acid were obtained.

| FRA, percent | Water ratio | Isomerized N Wood Rosin, Acid No. 165 | | | Tall Oil Resin Acids, Acid No. 170 | | | pH | |
|---|---|---|---|---|---|---|---|---|---|
| | | Yield, percent | Acid No. | Na₂SO₄ conc., percent | Yield, percent | Acid No. | Na₂SO₄ conc., percent | before crystallization | of filtrate |
| 10 | 25 | -- | --- | ---- | 6 | 134 | 0.09 | 8.7 | 9.5 |
| 20 | 25 | -- | --- | ---- | 15 | 134 | 0.17 | 8.5 | --- |
| 30 | 25 | 30 | 128 | 0.25 | 40 | 134 | 0.26 | 8.4 | --- |
| 40 | 25 | 46 | 126 | 0.35 | 50 | 138 | 0.34 | 8.3 | --- |
| 50 | 25 | -- | --- | ---- | 54 | 136 | 0.43 | 8.2 | --- |
| 60 | 25 | 49 | 127 | 0.50 | 57 | 136 | 0.52 | 8.2 | --- |
| 65 | 25 | 51 | 128 | 0.54 | 60 | 138 | 0.56 | --- | --- |
| 70 | 25 | 56 | 126 | 0.58 | 61 | 137 | 0.60 | 8.1 | --- |
| 75 | 25 | 59 | 131 | 0.62 | 62 | 139 | 0.65 | 8.0 | 8.5 |
| 80 | 25 | 60 | ¹180 | 0.66 | 63 | ¹180 | 0.69 | 7.7 | 8.2 |

¹ Abietic acid.

etc. Due to its high content of neutral matter which usually has the consistency of a soft solid or of a viscous liquid, the non-abietic acid portion as recovered from the filtrate is, as a rule, soft and tacky. By removing the neutral bodies, non-abietic type resin acids of a satisfactory acid number and melting point are obtained. Such removal of the neutral matter can be effected by neutralizing the resin acid content with an alkali metal base such as sodium hydroxide, regulating the concentration of the soap solution to provide more than 30 grams of neutralized resin acids per 100 grams of soap solution, and extracting the neutral bodies with a solvent such as hydrocarbon solvent. Application of this process to the non-abietic acid fraction is, due to the high neutral body content of the latter, much more economical than extracting the neutral matter from the starting material.

In contrast to the abietic acid fraction, the recovered non-abietic type acids are, even when freed of the major portion of neutral matter, non-crystallizing when kept for prolonged periods at temperatures ranging from their melting point to about 150° C. The resin acids obtained by removing the major portion of the neutral bodies from the non-abietic acid portion have higher melting points than the resin acid mixture from which they originate. Thus, the melting points of N wood rosin and isomerized N wood rosin, as used in Examples 1 and 2 respectively, were 80 and 82° C. respectively. The non-abietic acid portions freed from neutral bodies had melting points of 90° and 93° C. respectively. The combination of high melting point and lack of crystallizability are novel features heretofore not found in any of the so-called non-crystallizing rosins.

The following examples illustrate the present process in its most important phases, such as the effect of the FRA ratio, use of different starting materials, and some of the numerous variations in procedure for obtaining dispersions of a certain FRA ratio.

*Example 4*

Samples of neutral soap solutions of isomerized N wood rosin and of tall oil resin acids, which were diluted with distilled water to a water ratio of 25, were heated to 60° C. and the soap partially decomposed with dilute sulphuric acid, the FRA ratio increasing with each sample. The resulting dispersions were allowed to crystallize at a temperature of 60° C. Yields and acid numbers of the crystalline quarter salt, calculated salt concentrations and pH values for the tall oil resin

*Example 5*

Ten grams "Commercial Abietic Acid," acid number 171, were neutralized with aqueous sodium hydroxide and the soap solution diluted to 400 cc. The solution was heated to 90° C. and 40% of the soap decomposed with dilute sulphuric acid. The dispersion was allowed to crystallize at 80° C. for two hours.

Crystalline product.—4.3 grams quarter salt, acid number 127.

*Example 6*

Five grams isomerized N wood rosin were reacted with the calculated quantity of 2 N sodium hydroxide, the solution diluted to 100 cc., heated to about 90° C. and kept at that temperture while carbon dioxide was bubbled through for several hours. Quarter salt needles started to form toward the end of that period. The milky dispersion was kept at 75° C. for several hours when the quarter salt crystals set to a solid meshwork, filling out the whole or the liquid volume. The crystals were washed on the filter until the soap reaction of the filtrate was negative.

Crystalline product.—3.0 grams quarter salt, acid number 126.

*Example 7*

Five grams isomerized N wood rosin were similarly neutralized and diluted as in Example 6. To the hot solution were added 2.5 cc. of an aqueous sulphur dioxide solution which titrated 2.2 N using phenolphthalein as indicator. The resulting dispersion was crystallized at 75° C.

Crystalline product.—2.3 grams quarter salt, acid number 129.

*Example 8*

Five grams tall oil resin acids, acid number 175, were refluxed with 1.95 cc. 4.0 N potassium hydroxide to neutralize 50% of the resin acids. The mixture was incorporated into 100 cc. boiling water with vigorous stirring. Almost immediately quarter salt began to crystallize.

Crystalline product.—3.0 grams quarter salt, acid number 126.

*Example 9*

Ten grams isomerized N wood rosin were reacted with sufficient sodium hydroxide to neutralize 40% of the resin acids. The mixture was transferred into 250 cc. warm water containing sufficient ammonia to cause complete solution of the mixture. The soap solution was now boiled until the odor of ammonia disappeared. The resulting dispersion was allowed to crystallize at about 80° C.

*Crystalline product.*—5.3 grams quarter salt, acid number 129.

Example 10

On removing the solvent from a resin acid soap raffinate resulting from the tall oil separation process according to Patent No. 2,348,970, an acid sodium resinate was obtained which had the following composition: Sodium acid resinate containing 35% free resin acids, 64.5%; water, 30.3%; sodium sulphate, 5.3%.

191 grams of this mixture were stirred into 2600 cc. boiling water. The FRA ratio was adjusted to 60% by adding sulphuric acid. At this point, the sodium sulphate concentration of the aqueous phase of the dispersion was calculated as 0.6%. The dispersion was allowed to crystallize and then filtered.

*Crystalline product.*—64.5 grams quarter salt, acid number 131.

A portion of the quarter salt was transformed into abietic acid according to the procedure of the co-pending application, Serial No. 745,721. The abietic acid obtained had an acid number of 183 and a specific rotation of −45°.

Example 11

A crude tall oil was rapidly distilled at a pressure of 13 mm. until the distillate was 55% by weight of the charge. The still residue had an acid number of 129 and the composition, 50.6% resin acids, 22.1% fatty acids and 27.3% unsaponifiable.

Ten grams of the still residue were completely neutralized with sodium hydroxide, the soap stirred into 300 cc. boiling water and sulphuric acid added to decompose 65% of the resin acid soap. The resulting dispersion was allowed to crystallize for several hours.

*Crystalline product.*—2.9 grams quarter salt, acid number 131.

Example 12

Twenty grams crude resin acid crystals separated by centrifuging crystallized crude tall oil and containing 20% fatty acids were heated with 2.31 N sodium hydroxide to neutralize all the fatty and resin acids present. The soap solution was diluted with 600 cc. hot water and dilute sulphuric acid added in an amount equivalent to 75% of the resin acids present. The dispersion was allowed to stand until a solid meshwork of crystals formed.

*Crystalline product.*—10.8 grams quarter salt, acid number 130.

Example 13

One hundred cubic centimeters of a resin acid soap solution obtained by the tall oil separation process according to Patent No. 2,356,988 and containing 8.3 grams resin acids and 2.3 grams fatty acid esters plus unsaponifiable were diluted with 232 cc. water. The solution was heated to 80° C. and 72.5% of the soap decomposed with sulphuric acid. The dispersion was allowed to stand at 80° C. for several hours and then filtered.

*Crystalline product.*—2.7 grams quarter salt, acid number 133.

Example 14

In a mixture of 10 grams isomerized N wood rosin and 10 grams crystalline resin acids obtained by separation from a crystallized crude tall oil in which the fatty acids were esterified, 80% of the acidity was neutralized by refluxing with 2 N sodium hydroxide and the hot mixture stirred into 1 liter boiling water. The FRA ratio was now increased to 70% by the addition of 2 N sulphuric acid and the resulting dispersion allowed to crystallize while cooling slowly to room temperature.

*Crystalline product.*—11.7 grams quarter salt, acid number 135.

Example 15

Ten grams abietic acid obtained according to the process of my co-pending application, Serial No. 745,721, were completely neutralized with sodium hydroxide and the volume of the soap solution made up to 300 cc. The solution was now heated to near the boiling point and 70% of the soap decomposed with sulphuric acid. The quarter salt crystallized rapidly.

*Crystalline product.*—8.0 grams quarter salt, acid number 135.

I claim as my invention:

1. The method of recovering abietic acid from mixed resin acid material of the group, consisting of rosin, isomerized rosin, tall oil resin acids and their mixture, and alkali metal soaps of said materials, which comprises preparing an aqueous dispersion containing said resin acid material in partially neutralized condition at a free resin acids ratio in the range of from 10% to 75% and in from 10 to 50 parts by weight of water, and crystallizing abietic acid therefrom in the form of its quarter salt by permitting the dispersion to stand at a temperature of from about normal room temperature to about 100° C.

2. The method of separating mixed resin acid material of the group consisting of rosin, isomerized rosin, tall oil resin acids and their mixtures and alkali metal soaps of said materials into crystalline abietic acid material and non-crystallizing non-abietic acid material fractions, which comprises preparing an aqueous dispersion containing said mixed resin acid material in a condition of from 25% to 60% alkali neutralization and in from 10 to 50 parts by weight of water, crystallizing abietic acid therefrom in the form of its quarter salt by permitting the dispersion to stand at a temperature of from about normal room temperature to about 100° C., and separating the resulting crystalline material from the aqueous medium, the latter containing the non-abietic type resin acids.

3. The process of claim 2 wherein the non-abietic type resin acids are separated from neutral matter contained in said aqueous medium and recovered as a separate product of the process.

4. The process of claim 3 wherein separation is effected by neutralizing the resin acid content with an aqueous solution of an alkali metal base while regulating the concentration of the resulting soap solution to provide more than 30 grams of neutralized resin acids per 100 grams of soap solution, and extracting the neutral bodies therefrom with a hydrocarbon solvent.

5. The method of separating mixed resin acid material of the group consisting of rosin, isomerized rosin, tall oil resin acids and their mixtures and alkali metal soaps of said materials into crystalline abietic acid material and non-crystallizing non-abietic acid material fractions, which comprises preparing an aqueous dispersion containing said mixed resin acid material in a condition of partial neutralization regulated to a free resin acids ratio of from 10% to 75% and in from 10 to 50 parts by weight of water to provide a pH of from about 9.5 to about 8.0, crystallizing abietic acid therefrom in the form of its quarter salt by permitting the dispersion to stand at a temperature of from about 35° C. to about 100° C., and separating the resulting crystalline material from the aqueous phase.

6. The method of separating abietic acid from mixed resin acid material of the group consisting of rosin, isomerized rosin, tall oil resin acids and their mixtures, which comprises preparing an aqueous dispersion containing said resin acid material in a partially neutralized condition at an approximately 75% free resin acid content and in from 20 to 50 parts by weight of water, and crystallizing abietic acid material therefrom in the form of a mixture of abietic acid and its quarter salt by permitting the dispersion to stand at a temperature of from about 35° C. to about 100° C.

7. The method of separating abietic acid from mixed resin acid material of the group consisting of alkali neutralized rosin, isomerized rosin, tall oil resin acids and their mixtures, which comprises preparing an aqueous dispersion containing said material regulated to a free resin acids ration of from 10% to 75% in from 10 to 50 parts by weight of water to form an oil-in-water type dispersion and to reduce concentration of alkali metal salt content below 2%, and crystallizing abietic acid therefrom in the form of its quarter salt by permitting the dispersion to stand at a temperature of from about 35° C. to about 100° C.

8. The method of separating abietic acid from mixed resin acid material of the group consisting of rosin, isomerized rosin, tall oil resin acids and their mixtures and alkali metal soaps of said mixtures, which comprises preparing an aqueous dispersion containing said material in partially neutralized condition at a free resin acids ratio of from about 40% to 75% and in from 10 to 50 parts by weight of water, and crystallizing the abietic acid therefrom predominantly in the form of its quarter salt by permitting the dispersion to stand at a temperature of from about 35° C. to about 100° C.

9. The process of recovering abietic acid from mixed resin acid material of the group consisting of rosin, isomerized rosin, tall oil resin acids, and their mixtures, which comprises neutralizing said material with an aqueous alkali, agitating and diluting the soap solution with added water to provide a water to solids ratio of approximately 20–50 to 1 and to reduce concentration of salt subsequently formed in the process below about 1%, decomposing the soap with an acidic material until from 10% to 75% of the resin acids are in the free state, and crystallizing the abietic acid therefrom in the form of its quarter salt by permitting the dispersion to stand at a temperature of from about 35° C. to about 100° C.

10. The process of claim 9 wherein the alkali is an alkali metal hydroxide.

11. The process of claim 9 wherein the acidic material is sulfuric acid.

12. The process of claim 9 wherein the resin acid material is wood rosin.

13. The process of claim 9 wherein the resin acid material is isomerized rosin.

14. The process of claim 9 wherein the resin acid material is tall oil resin acids.

15. The process of separating abietic acid from aqueous solutions of the alkali metal soaps of mixed resin acid material of the group consisting of rosin, isomerized rosin, tall oil resin acids and their mixtures, which comprises agitating and diluting the soap solution with water to provide a water to solids ratio of approximately 20–50 to 1 and to reduce concentration of alkali metal salts formed in the process below about 1%, decomposing the soap with an acidic material until from 10% to 75% of the resin acids are in the free state, and crystallizing the abietic acid therefrom in the form of its quarter salt by permitting the dispersion to stand at a temperature of from about 35° C. to about 100° C.

16. The process of separating abietic acid from aqueous solutions of the alkali metal soaps of mixed resin acid material of the group consisting of rosin, isomerized rosin, tall oil resin acids and their mixtures, which comprises diluting the soap solution with water to form a water to solids ratio of approximately 20–50 to 1, saturating the soap with carbon dioxide to provide a free resin acids ratio in the range of from 10% to 75%, and crystallizing the abietic acid therefrom in the form of its quarter salt by permitting the dispersion to stand at a temperature of from about 35° C. to about 100° C.

17. The process of separating mixed resin acid material of the group consisting of rosin, isomerized rosin, tall oil resin acids and their mixtures into abietic acid and non-abietic portions, which comprises neutralizing from 25% to 60% of the free resin acid content of said material with an alkali, and dispersing it in from 10 to 50 parts by weight of water, thereafter permitting the dispersion to stand at a temperature of from about 35° C. to about 100° C. until abietic acid in the form of its quarter salt crystallizes therefrom, and separating the crystalline material from the aqueous medium, the latter containing a mixture of non-abietic type resin acids and neutral matter.

18. The process of separating abietic acid contained in mixed resin acid material of the group consisting of rosin, isomerized rosin, tall oil resin acids and their mixtures, which comprises neutralizing from 25% to 60% of the free resin acid content of said material with an alkali, incorporating it in from 10 to 50 parts by weight of water and solubilizing the remaining free resin acid content therein with ammonia, heating the mixture to drive off the ammonia and thereby dispersing the resin acids liberated by removal of the ammonia, and crystallizing abietic acid therefrom in the form of its quarter salt by permitting the dispersion to stand at a temperature of from about 35° C. to about 100° C.

19. The method of separating abietic acid from mixed resin acid material of the group consisting of rosin, isomerized rosin, tall oil resin acids and their mixtures, which comprises preparing an aqueous dispersion containing said material in partially neutralized condition at a free resin acids ratio of from about 40% to 75% and in from 10 to 50 parts by weight of water by first neutralizing the free resin acids in excess of said ratio and then decomposing them to said ratio, and crystallizing abietic acid therefrom in the form of its quarter salt by permitting the dispersion to stand at a temperature of from about normal room temperature to about 100° C.

20. The process of obtaining the quarter salt of abietic acid from crystalline abietic acid, which comprises neutralizing said crystalline material with an aqueous alkali, agitating and diluting the soap solution with added water to provide a water to solids ratio of approximately 20–50 to 1 and to reduce concentration of salt subsequently formed in the process below about 1%, decomposing the soap with an acidic material until from 10% to 75% of the resin acids are in the free state, and crystallizing abietic acid therefrom in the form of its quarter salt by permitting the dispersion to stand at a temperature of from about 35° C. to about 100° C.

21. The process of claim 9 wherein the alkali is an alkali metal carbonate.

FREDERICK H. GAYER.

REFERENCES CITED

The following references are of record in the file of this patent:

Palkin et al.: J. A. C. S., vol. 55, pp. 3679–3680 (1933).